US012720156B2

(12) United States Patent
Chen

(10) Patent No.: US 12,720,156 B2
(45) Date of Patent: Aug. 25, 2026

(54) METHOD FOR DISPLAYING LIVE STREAM PICTURE, APPARATUS, ELECTRONIC DEVICE, AND STORAGE MEDIUM

(71) Applicant: Beijing Bytedance Network Technology Co., Ltd., Shijingshan District (CN)

(72) Inventor: Yingyi Chen, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 57 days.

(21) Appl. No.: 18/842,009

(22) PCT Filed: Feb. 22, 2023

(86) PCT No.: PCT/CN2023/077603

§ 371 (c)(1),
(2) Date: Aug. 27, 2024

(87) PCT Pub. No.: WO2023/160573

PCT Pub. Date: Aug. 31, 2023

(65) Prior Publication Data

US 2025/0184567 A1 Jun. 5, 2025

(30) Foreign Application Priority Data

Feb. 28, 2022 (CN) ......................... 202210188120.3

(51) Int. Cl.
*H04N 21/44* (2011.01)
*H04N 21/2187* (2011.01)
(Continued)

(52) U.S. Cl.
CPC ... *H04N 21/44016* (2013.01); *H04N 21/2187* (2013.01); *H04N 21/4312* (2013.01); *H04N 21/472* (2013.01)

(58) Field of Classification Search
CPC ......... H04N 21/44016; H04N 21/2187; H04N 21/4312; H04N 21/472
See application file for complete search history.

(56) References Cited

U.S. PATENT DOCUMENTS

| | | | | |
|---|---|---|---|---|
| 2011/0249086 | A1* | 10/2011 | Guo ....................... | H04N 5/272 348/E7.083 |
| 2016/0057363 | A1 | 2/2016 | Posa | |

(Continued)

FOREIGN PATENT DOCUMENTS

| | | | |
|---|---|---|---|
| CN | 106921866 | A | 7/2017 |
| CN | 207150751 | U | 3/2018 |

(Continued)

OTHER PUBLICATIONS

China National Intellectual Property Administration, Office Action and Search Report Issued in Application No. 202210188120.3, Apr. 27, 2023, 27 pages. (Submitted with partial English translation).

(Continued)

*Primary Examiner* — Sumaiya A Chowdhury
(74) *Attorney, Agent, or Firm* — Alleman Hall LLP

(57) ABSTRACT

An embodiment of the present disclosure provides a method and apparatus for displaying live stream picture, electronic device and medium. The method includes: displaying a picture editing interface in response to a received live stream picture editing request, wherein the picture editing interface includes at least two video source windows used to display live stream video sources; and receiving a video fusion operation input for the at least two video source windows, and displaying a preview picture of a fused live stream picture corresponding to the video fusion operation in a preset fused display way, wherein picture foreground infor- (Continued)

mation and picture background information of the fused live stream picture come from different live stream video sources.

20 Claims, 5 Drawing Sheets

(51) Int. Cl.
*H04N 21/431* (2011.01)
*H04N 21/472* (2011.01)

(56) References Cited

U.S. PATENT DOCUMENTS

| | | | |
|---|---|---|---|
| 2020/0120369 | A1 | 4/2020 | Oz |
| 2020/0186887 | A1 | 6/2020 | Kwon et al. |

FOREIGN PATENT DOCUMENTS

| | | | | | |
|---|---|---|---|---|---|
| CN | 110290425 | A | * | 9/2019 | ............. H04N 5/265 |
| CN | 111432235 | A | | 7/2020 | |
| CN | 112470482 | A | | 3/2021 | |
| CN | 112637614 | A | | 4/2021 | |
| CN | 112702615 | A | | 4/2021 | |
| CN | 112822542 | A | | 5/2021 | |
| CN | 113873272 | A | | 12/2021 | |
| CN | 113873273 | A | | 12/2021 | |
| CN | 113873311 | A | | 12/2021 | |
| CN | 113989173 | A | | 1/2022 | |
| CN | 114584797 | A | | 6/2022 | |
| WO | 2020133373 | A1 | | 7/2020 | |

OTHER PUBLICATIONS

ISA China National Intellectual Property Administration, International Search Report Issued in Application No. PCT/CN2023/077603, Jun. 17, 2023, 11 pages. (Submitted with partial English translation).

* cited by examiner

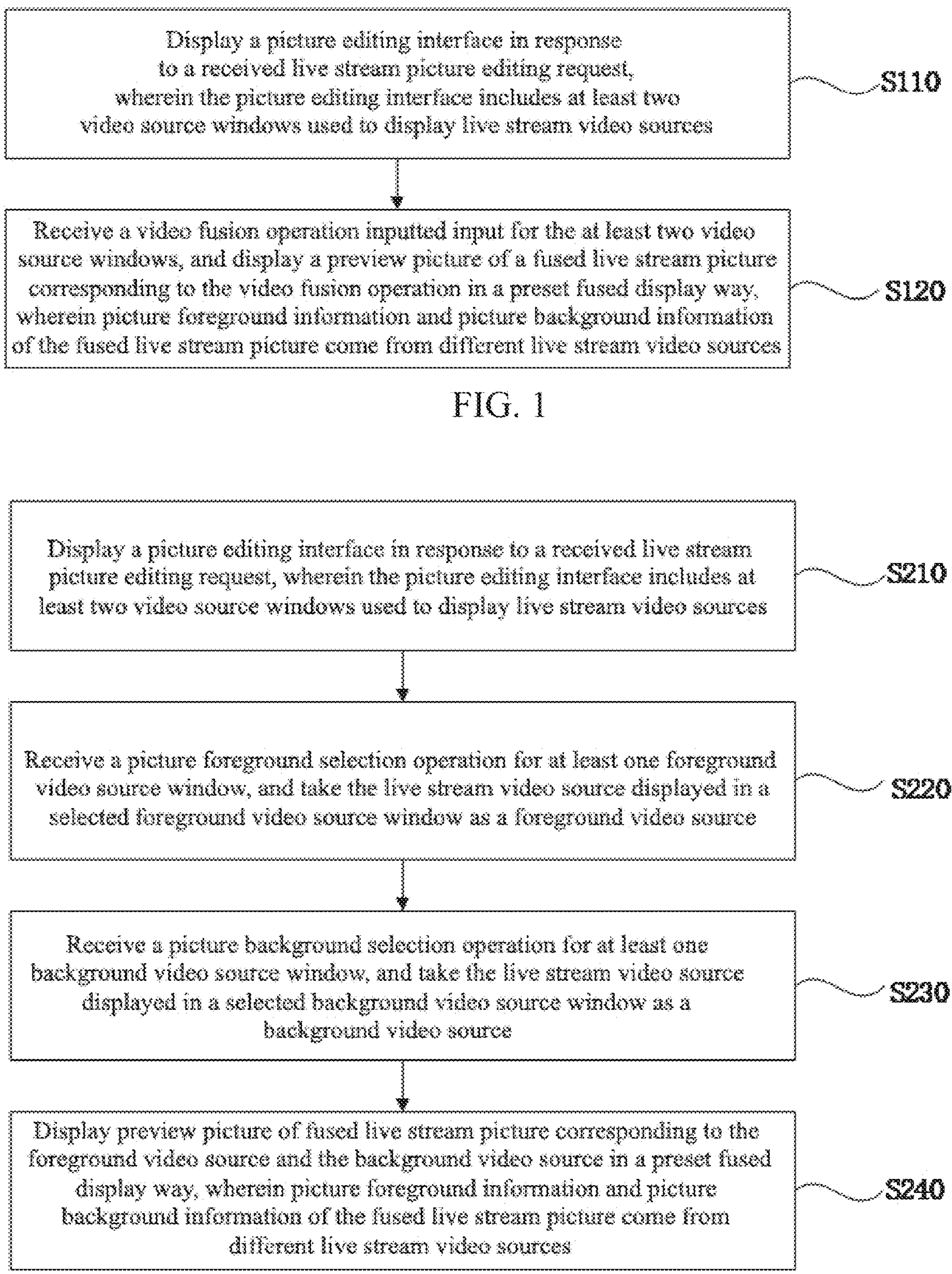
Display a picture editing interface in response to a received live stream picture editing request, wherein the picture editing interface includes at least two video source windows used to display live stream video sources
S110
Receive a video fusion operation inputted input for the at least two video source windows, and display a preview picture of a fused live stream picture corresponding to the video fusion operation in a preset fused display way, wherein picture foreground information and picture background information of the fused live stream picture come from different live stream video sources
S120
FIG. 1
Display a picture editing interface in response to a received live stream picture editing request, wherein the picture editing interface includes at least two video source windows used to display live stream video sources
S210
Receive a picture foreground selection operation for at least one foreground video source window, and take the live stream video source displayed in a selected foreground video source window as a foreground video source
S220
Receive a picture background selection operation for at least one background video source window, and take the live stream video source displayed in a selected background video source window as a background video source
S230
Display preview picture of fused live stream picture corresponding to the foreground video source and the background video source in a preset fused display way, wherein picture foreground information and picture background information of the fused live stream picture come from different live stream video sources
S240
FIG. 2

METHOD FOR DISPLAYING LIVE STREAM PICTURE, APPARATUS, ELECTRONIC DEVICE, AND STORAGE MEDIUM

CROSS-REFERENCE TO RELATED APPLICATIONS

This application is a national phase application of International Patent Application No. PCT/CN2023/077603, filed on Feb. 22, 2023, which claims priority to Chinese Patent Application No. 202210188120.3, filed to the China National Intellectual Property Administration on Monday, Feb. 28, 2022, the entire content of which is herein incorporated by reference.

TECHNICAL FIELD

Embodiments of the present disclosure relate to a field of image processing technologies, for example, to a method for displaying live stream picture, an apparatus therefor, an electronic device, and a storage medium.

BACKGROUND

With the popularization of the Internet and the rapid development of intelligent terminals, more and more information spread via a network, and forms of spreading the information are also diverse, such as online live stream. For each online live stream room, in the process of online live stream, a live stream user often only displays picture collected by a camera of a terminal used to carry out online live stream to viewing users, and do not support that the live stream user edits live stream picture, so that the display form of the live stream picture is relatively single, personalized needs of the live stream user cannot be met, and user experience is influenced.

SUMMARY

Embodiments of the present disclosure provide a method for displaying live stream picture, an apparatus therefor, an electronic device, and a storage medium.

An embodiment of the present disclosure provides a method for displaying live stream picture, wherein the method includes:

- displaying a picture editing interface in response to a received live stream picture editing request, wherein the picture editing interface includes at least two video source windows used to display live stream video sources; and
- receiving a video fusion operation input for the at least two video source windows, and displaying a preview picture of a fused live stream picture corresponding to the video fusion operation in a preset fused display way, wherein picture foreground information and picture background information of the fused live stream picture come from different live stream video sources.

An embodiment of the present disclosure provides an apparatus for displaying live stream picture, the apparatus includes a picture editing request module and a fused picture preview module,

- the picture editing request module is configured to display a picture editing interface in response to a received live stream picture editing request, wherein the picture editing interface includes at least two video source windows used to display live stream video sources; and
- the fused picture preview module is configured to receive a video fusion operation input for the at least two video source windows, and display a preview picture of a fused live stream picture corresponding to the video fusion operation in a preset fused display way, wherein picture foreground information and picture background information of the fused live stream picture come from different live stream video sources.

An embodiment of the present disclosure provides an electronic device, the electronic device includes one or more processors and a storing apparatus,

- the storing apparatus is configured to store one or more programs,
- wherein the one or more programs, when executed by the one or more processors, cause the one or more processors implement the method for displaying live stream picture provided by any embodiment of the present disclosure.

An embodiment of the present disclosure provides a computer-readable storage medium having a computer program stored thereon, wherein the computer program, when executed by a processor, implements the method for displaying live stream picture provided by any embodiment of the present disclosure.

BRIEF DESCRIPTION OF DRAWINGS

The accompanying drawings that need to be used in describing embodiments will be briefly introduced below. The accompanying drawings introduced are accompanying drawings of some of embodiments to be described in the present disclosure, rather than all of the accompanying drawings. For those of ordinary skill in the art, other accompanying drawings can be obtained based on these accompanying drawings without creative labors.

FIG. 1 is a flowchart of a method for displaying live stream picture provided by an embodiment of the present disclosure;

FIG. 2 is a flowchart of a method for displaying live stream picture provided by an embodiment of the present disclosure;

DETAILED DESCRIPTION

Figure 3:
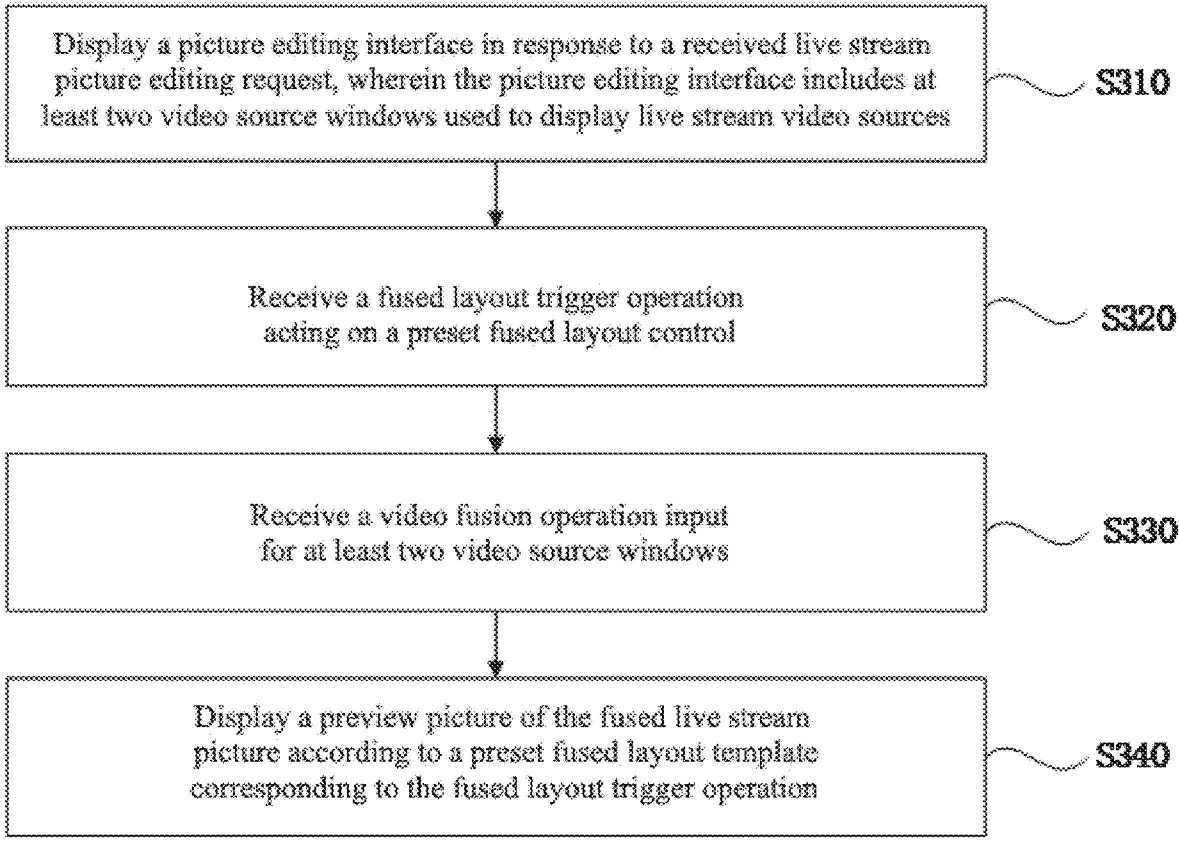
FIG. 3 is a flowchart of a method for displaying live stream picture provided by an embodiment of the present disclosure.

Although certain embodiments of the present disclosure are shown in the accompanying drawings, it should be understood that the present disclosure can be implemented in various forms, and should not be construed as limited to the embodiments described herein. Instead, these embodiments are provided for a more thorough and complete understanding of the present disclosure. It should be understood that the accompanying drawings and embodiments of the present disclosure are only for illustrative purposes and are not intended to limit the protection scope of the present disclosure.

It should be understood that all the steps recorded in a method implementation of the present disclosure can be executed in a different order and/or concurrently. Furthermore, the method implementation may include additional steps and/or omit executing the steps shown. The scope of the present disclosure will not be limited in this regard.

The term "including" and its variants used herein are open-ended including, that is, "including but not limited to". The term "based on" is "at least partially based on". The term "one embodiment" represents "at least one embodiment". The term "another embodiment" represents "at least one another embodiment". The term "some embodiments" represents "at least some embodiments". Related definitions of other terms will be given in the following descriptions.

It should be noted that concepts such as "first" and "second" mentioned in the present disclosure are only used to distinguish apparatuses, modules or units, and are not intended to limit the order or interdependence of the functions executed by these apparatuses, modules or units. It should be noted that the modifications "one" and "a plurality of" mentioned in the present disclosure are exemplary rather than restrictive. Those skilled in the art should understand that, unless otherwise specified in the context, it should be understood as "one or more".

The names of messages or information interacted between a plurality of apparatuses in the implementations of the present disclosure are only used for illustrative purposes, and are not used to limit the scope of these messages or information.

FIG. 1 is a flowchart of a method for displaying live stream picture provided by an embodiment of the present disclosure. This embodiment can be applied to application scenarios of online live stream. The method can be executed by an apparatus for displaying live stream picture, and the apparatus can be implemented by software and/or hardware, and can be configured in a terminal and/or a server to implement the method for displaying live stream picture in this embodiment of the present disclosure. Typically, the terminal may be a smartphone, or any terminal device with online live stream functions such as a laptop or a tablet, or a terminal device that can control other online live stream devices to display the live stream picture, such as a directed stream device.

As shown in FIG. 1, the method of this embodiment includes:

S110: displaying a picture editing interface in response to a received live stream picture editing request, where the picture editing interface includes at least two video source windows used to display live stream video sources.

The live stream picture editing request can be understood as a function enable request used for enabling the function of editing the live stream picture. The picture editing interface can be understood as an interactive interface that provides the function of editing the live stream picture. In addition to including the at least two video source windows used to display the live stream video sources, the picture editing interface may further include a control used to edit the live stream picture, a display region for an edited live stream picture, and the like. The video source window is a display window used to display the live stream video source. The video source window can be distinguished according to application scenarios of the live stream video source, for example, it can be distinguished according to picture foreground information or picture background information of a displayed live stream video source that is used for editing the live stream picture. Exemplarily, the video source windows include a foreground video source window and a background video source window. The number and layout of the video source windows can be set according to the actual situation, which will not be limited here. Exemplarily, the number and layout of the video source windows can be determined according to the size of a terminal display screen used to execute the method for displaying live stream picture and a way to acquire the live stream video source.

At least two can be understood as two or more. In this embodiment of the present disclosure, the picture editing interface includes at least two video source windows used to display live stream video sources, which has the advantage of supporting accessing two or more live stream video sources, thereby laying a foundation for editing the live stream picture based on multiple video sources.

It can be understood that in order to successfully fuse two or more live stream video sources, the method for displaying live stream picture may further include: acquiring the live stream video sources, and displaying the live stream video sources in the video source windows used to display the live stream video sources.

Exemplarily, the live stream video source may include but is not limited to at least one of video data of a local host camera, video data of an external camera, screen video data of an external device, network video data, picture or video data in a local host target storage space, or picture or video data in a cloud target storage space. A local host can be understood as a device used to execute the method for displaying live stream picture. The local host camera can be understood as a camera carried by the local host itself.

There are various ways to acquire the live stream video source. For example, camera video data, video camera video data, external unit video data and the like can be accessed via a universal serial bus interface provided on the body of the local host. Video data of an external video camera, screen video data of an external mobile phone, and camera video data can also be acquired in a manner of wireless transmission via a local area network, a wide area network, Bluetooth or the like.

In an example, the acquiring the live stream video sources may include at least one of the ways of:

- Acquiring video data collected by the camera carried by the local host itself as the video data of the local host camera;
- Acquiring video data transmitted by an external camera interface as the video data of the external camera;
- Acquiring the screen video data of the external device based on a local host external device interface;
- Acquiring the network video data based on website address information input in a preset region;
- Acquiring the picture or video data in the local host target storage space according to a local storage path corresponding to the local host target storage space; and
- Acquiring the picture or video data in the cloud target storage space according to a cloud storage path corresponding to the cloud target storage space.

For the convenience of user's operations, in an example, dedicated video source windows are provided for live stream video sources from different sources, respectively. A source is used as a video type, that is, a correspondence relationship is established between the video source window and a live stream video source type, and a type identifier of a live stream video source corresponding to the video source window is added to the video source window. The advantage of this setting is that it is convenient for a user to distinguish different types of live stream video sources. In order to facilitate the user to manually add the live stream video source, video source add guidance information can be displayed when a video source add operation input for the video source window is received. The video source add guidance information is used for guiding the user on how to add the live stream video source, such as displaying a website address input box or displaying a two-dimensional code for establishing a connection.

Before the responding to a received live stream picture editing request, the method may further include: receiving a live stream picture editing request. In an example, there are various ways to generate the live stream picture editing request. Exemplarily, when a startup operation is received for a directed stream device, it is determined as that the live stream picture editing request is received. Alternatively, when preset voice information used for initiating the live stream picture editing request, it is determined as that the live stream picture editing request is received. Alternatively, when a request trigger operation for a preset request control used to initiate the live stream picture editing request is received, it is determined as that the live stream picture editing request is received.

It should be noted that the live stream video source in this embodiment of the present disclosure can be understood as a video associated with live stream, or supporting videos used in a live stream picture, or supporting a video pushed to a live stream room. The "live stream" in live stream video source is only used to describe a video involved in a live stream scenario, rather than limiting information such as video content and sources.

S120: receiving a video fusion operation input for the at least two video source windows, and displaying a preview picture of a fused live stream picture corresponding to the video fusion operation in a preset fused display way, where picture foreground information and picture background information of the fused live stream picture come from different live stream video sources.

The video fusion operation can be understood as an operation of triggering two or more live stream video sources to start fusion. Since the video fusion operation often involves the selection and fusion of the two or more live stream video sources, the video fusion operation can be implemented by combining two or more operations.

Exemplarily, the video fusion operation may include a foreground selection operation and a background selection operation. When both the foreground selection operation and the background selection operation are completed, it is determined as receiving the video fusion operation input for the at least two video source windows. For example, when it is detected that a selected number for the video source windows reaches a preset number, it is determined as receiving the video fusion operation input for the at least two video source windows. For example, when it is detected that a selected number for the foreground video source windows reaches a preset foreground number, and it is detected that a selected number for the background video source windows reaches a preset background number, it is determined as receiving the video fusion operation input for the at least two video source windows. For example, the video fusion operation may include a foreground selection operation and a background selection operation.

Exemplarily, the video fusion operation may include a fusion trigger operation for a preset video fusion control. The preset video fusion control may be a virtual element provided on a picture editing interface, or a physical element provided on an executing device configured to execute the method for displaying live stream picture. A style of the preset video fusion control can be set according to actual needs, which will not be limited here. It may be a button identified as "Picture Preview" on the picture editing interface.

In a technology for displaying related live stream video picture, only information collected by the local host camera is often displayed, that is, only video information of one live stream video source is displayed, while it is difficult to display video information of two or more live stream video sources in a live stream room simultaneously. Even if joint live stream is done through a function of communicating via microphones, there still remains that a case where only picture live stream of a camera of a live stream device is supported, and the live stream picture are still their respective live stream picture, and the display way is still relatively single. In this embodiment of the present disclosure, in response to the received video fusion operation input for the at least two video source windows, displayed information in different live stream video sources is divided into picture foreground information and picture background information for fusion, thereby enriching the display way of the live stream picture.

It can be understood that the live stream video source is composed of a series of image sequences. When the live stream video sources are fused, processing can be performed for each frame of image of the live stream video source. Therefore, before the displaying a fused live stream picture corresponding to the video fusion operation, the method may further include: acquiring a foreground video source and a background video source corresponding to the video fusion operation, and respectively determining a foreground image to be processed of the foreground video source and a background image to be processed of the background video source, where the foreground image to be processed and the background image to be processed have same time information; determining image foreground information of the foreground image to be processed and image background information of the background image to be processed, where the image foreground information is taken as the picture foreground information of the fused live stream picture, and the image background information is taken as the picture background information of the fused live stream picture, and fusing the picture foreground information with the picture background information to obtain the fused live stream picture corresponding to the video fusion operation. The advantage of this setting is that the synchronization between all live stream video sources in time can be guaranteed, which is in line with the real-time performance of live stream.

In an example, timestamps corresponding to all the video sources are aligned; when the video fusion operation input for the at least two video source windows is received, image frames with the same time information in the foreground video source and the background video source are used as the foreground image to be processed and the background image to be processed, respectively; then, the foreground image to be processed and the background image to be processed are each matted in a manner of matting to obtain image foreground information and image background information; and the image foreground information and the image background information are fused to obtain the fused live stream picture.

It should be noted that the fused live stream picture corresponding to the video fusion operation may be a frame of fused live stream picture corresponding to the time of the video fusion operation, or a number of frames of fused live stream picture with its time after the video fusion operation. It is only necessary to fuse image frames at different time points in the live stream video source by employing the method in this embodiment of the present disclosure.

In this embodiment, a picture editing interface including at least two video source windows used to display live stream video sources is displayed in response to a received live stream picture editing request, thereby providing an interaction function with a user, and a picture editing entry is provided for the user in response to the live stream picture editing request of the user; then, a video fusion operation input for the at least two video source windows is received, and a preview picture of a fused live stream picture corresponding to the video fusion operation is displayed in a preset fused display way, where picture foreground information and picture background information of the fused live stream picture come from different live stream video sources, which can fuse the live stream video sources corresponding to two or more video source windows, implement linkage between the two or more live stream video sources, enrich the display effect of videos, increase the fun of live stream, avoid a case where the display form of the live stream picture is single and editing is not supported, and enable the user to visually observe the presentation effect of the fused live stream picture, and thereby, the personalized needs of the user can be better met, and the live stream experience of the user is promoted.

FIG. 2 is a flowchart of a method for displaying live stream picture provided by an embodiment of the present disclosure. On the basis of any optional embodiment of the embodiments of the present disclosure in this embodiment, in an embodiment, the video fusion operation includes a picture foreground selection operation and a picture background selection operation, and the video source windows include a foreground video source window and a background video source window. The receiving a video fusion operation input for the at least two video source windows, and displaying a preview picture of a fused live stream picture corresponding to the video fusion operation in a preset fused display way includes: receiving a picture foreground selection operation for at least one foreground video source window, where a live stream video source displayed in a selected foreground video source window is taken as a foreground video source; receiving a picture background selection operation for at least one background video source window, where a live stream video source displayed in a selected background video source window is taken as a background video source; and displaying a preview picture of fused live stream picture corresponding to the foreground video source and the background video source in a preset fused display way.

The technical terms that are the same as or correspond to the above-mentioned embodiments will not be repeated here.

As shown in FIG. 2, the method of this embodiment may include:

S210: displaying a picture editing interface in response to a received live stream picture editing request, where the picture editing interface includes at least two video source windows used to display live stream video sources.

S220: receiving a picture foreground selection operation for at least one foreground video source window, where the live stream video source displayed in a selected foreground video source window is taken as a foreground video source.

The foreground video source window can be understood as that a live stream video source used for being displayed can be selected as a window of the foreground video source. It should be noted that whether the live stream video sources can be selected as the foreground video sources or which live stream video sources can be selected as the foreground video sources can be set according to the actual situation, which will not be limited here. For example, when the live stream video source displayed in the video source window includes a first target object, the video source window is used as the foreground video source window. The first target object may be a character, an animal or the like. Alternatively, when a video source of the live stream video source displayed in the video source window is a first preset source, the video source window can be used as the foreground video source window. The preset source may include a way to acquire the live stream video source or a provider of the live stream video source. Exemplarily, the first preset source may be a video collected by a camera on a terminal used to perform live stream, or a video collected by a local host camera used to display a fused live stream picture. Alternatively, when the live stream video source displayed in the video source window is a dynamic video, the video source window can be used as the foreground video source window.

The picture foreground selection operation may include an operation used for selecting or deselecting the foreground video source window. A corresponding result of the picture foreground selection operation may be that a certain foreground video source window or multiple foreground video source windows are selected. It can be understood that the live stream video source displayed in a selected video source window is taken as a foreground video source for being fused.

S230: receiving a picture background selection operation for at least one background video source window, where the live stream video source displayed in a selected background video source window is taken as a background video source.

It can be understood that the live stream video sources displayed in the foreground video source window and the background video source window may be the same or different. For example, when a video of the live stream video source displayed in the video source window includes a live stream video of a second target object, the video source window is used as the foreground video source window. The second target object may be mountains, water, buildings, flowers, plants and trees, and the like. Alternatively, when a video source of the live stream video source displayed in the video source window is a second preset source, the video source window can be used as the background video source window. The preset source may include a way to acquire the live stream video source or a provider of the live stream video source. Alternatively, when the live stream video source displayed in the video source window is a static picture, the video source window can be used as the background video source window. A way to distinguish whether the live stream video source is the static picture or the dynamic video can be determined by comparing differences in displayed content in image frames corresponding to preset time points.

The picture background selection operation may include an operation used for selecting or deselecting the background video source window. A corresponding result of the picture background selection operation may be that a certain background video source window or multiple background video source windows are selected. It can be understood that the live stream video source displayed in a selected video source window is taken as a background video source for being fused.

S240: displaying preview picture of fused live stream picture corresponding to the foreground video source and the background video source in a preset fused display way, where picture foreground information and picture background information of the fused live stream picture come from different live stream video sources.

It can be understood that the picture foreground information of the fused live stream picture comes from the foreground video source, while the picture background information of the fused live stream picture comes from the background video source.

In an embodiment, the foreground video source window and the background video source window switch display based on a switching trigger operation acting on a preset video source window switching control. There may be one video source window switching control or two video source window switching controls. In other words, the preset video source window switching controls corresponding to the foreground video source window and the background video source window may be a same control or different controls. Exemplarily, the video source window switching control may include a foreground video source display control and a background video source display control. The foreground video source display control may be a default video source display control, while the background video source display control may be a matting background control. In this embodiment of the present disclosure, the display form of the video source window switching control is not limited, as long as it can be used for implementing the switched display of the foreground video source window and the background video source window.

In this embodiment, by selecting the foreground video source according to the received image foreground selection operation for at least one foreground video source window, and selecting the background video source according to the received image background selection operation for at least one background video source window, the picture foreground information and the picture background information of the fused live stream picture can be autonomously selected, and the live stream picture editing request can be accurately acquired, thereby guaranteeing that the user needs can be accurately responded, implementing targeted fusion of the fused live stream picture, and improving user experience.

FIG. 3 is a flowchart of a method for displaying live stream picture provided by an embodiment of the present disclosure. On the basis of any optional embodiment of the embodiments of the present disclosure in this embodiment, in an embodiment, the method further includes: receiving a fused layout trigger operation acting on a preset fused layout control; and the displaying a preview picture of a fused live stream picture corresponding to the video fusion operation in a preset fused display way includes: displaying the preview picture of the fused live stream picture according to a preset fused layout template corresponding to the fused layout trigger operation, where the preset fused layout template includes a maximum number of live stream video sources allowed to be fused, and a display size and a display position of each live stream video source.

The technical terms that are the same as or corresponding to the above-mentioned embodiments will not be repeated here.

As shown in FIG. 3, the method of this embodiment may include:

S310: displaying a picture editing interface in response to a received live stream picture editing request, where the picture editing interface includes at least two video source windows used to display live stream video sources.

S320: receiving a fused layout trigger operation acting on a preset fused layout control.

The preset fused layout control can be understood as a control element used to determine the layout of a fused live stream picture after triggering. The preset fused layout control is generally a virtual element provided in the picture editing interface. There are various display forms of the preset fused layout control, such as texts, graphics, or a combination thereof. Exemplarily, the preset fused layout control can be displayed with a thumbnail of a layout sample of the fused live stream picture as a control identifier. The advantage of this setting is that a user can be facilitated to quickly select a desired preset fused layout control according to the identifier, the operation is convenient, and the interaction efficiency is improved.

The fused layout trigger operation can be understood as an operation that, after acting on the preset fused layout control in a preset trigger manner, can trigger the preset fused layout control to determine the layout of the fused live stream picture. For example, ways to act on the preset fused layout control may include but are not limited to operations such as click, double click, long press, short press, or slide.

In an example, after receiving the fused layout trigger operation acting on the preset fused layout control, the method further includes: displaying a preset fused layout template corresponding to the fused layout trigger operation in a display region used for displaying a preview picture of a fused live stream picture in the picture editing interface, so that the user can view the layout effect of the picture.

S330: receiving a video fusion operation input for at least two video source windows.

In an example, the receiving a video fusion operation input for at least two video source windows may be, for example, receiving a video source add operation that adds a live stream video source to a preset fused layout template. For example, the live stream video source can be added to the preset fused layout template in a dragging manner, or it can be added to the preset fused layout template in a manner of acting on an add indication control in the video source window. The add indication control may be a control used to indicate which region in the preset fused layout template the live stream video source is added to. Alternatively, an existing live stream video source can be replaced with a new one in a manner of dragging the new live stream video source into a position of the existing live stream video source in the preset fused layout template.

In an example, when it is necessary to delete a live stream video source in a preset fused layout template, the live stream video source can be removed from the preset fused layout template in a manner of dragging the live stream video source out of the preset fused layout template.

In an example, the live stream video source can also be flipped, for example, the live stream video source is subjected to mirror transformation. Alternatively, displayed information of the live stream video source in the video source window is deleted by acting on a delete indication control in the video source window and no longer displayed.

S340: displaying a preview picture of the fused live stream picture according to a preset fused layout template corresponding to the fused layout trigger operation.

The preset fused layout template includes a maximum number of live stream video sources allowed to be fused, and a display size and a display position of each live stream video source. The preset fused layout template can be understood as a preset template or sample for the display size and display position of each live stream video source for video source fusion in the fused live stream picture. It can be understood that the number of the preset fused layout templates may be one or more. A style of the preset fused layout template can be set according to actual needs, which will not be limited here. Exemplarily, different preset fused layout controls can be provided according to a maximum number of live stream video sources to be fused. In an example, different preset fused layout templates can also be provided according to the display size and display position of each video source for the number of certain live stream video sources to be fused.

It should be noted that a correspondence relationship between the preset fused layout template and the preset fused layout control may be a one-to-one correspondence relationship or a many-to-one correspondence relationship. When a preset fused layout control corresponds to multiple preset fused layout templates, a preset fused layout template corresponding to the preset fused layout control can be switched by the fused layout trigger operation acting on the preset fused layout control.

In this embodiment, the fused layout trigger operation acting on the preset fused layout control can be received, thereby providing the user with a selection function for fused layout. The preview picture of the fused live stream picture is displayed according to the preset fused layout template corresponding to the fused layout trigger operation; the fused live stream picture is displayed based on a selected preset fused layout template in response to the fused layout trigger operation for the user to preview. Due to a one-click layout function, the operation is simple and convenient. Moreover, the preset fused layout template includes a maximum number of live stream video sources allowed to be fused, and a display size and display position of each live stream video source, so that the user can have a clear view of the layout of the fused live stream picture, thereby promoting user experience.

Figures 4, 5:
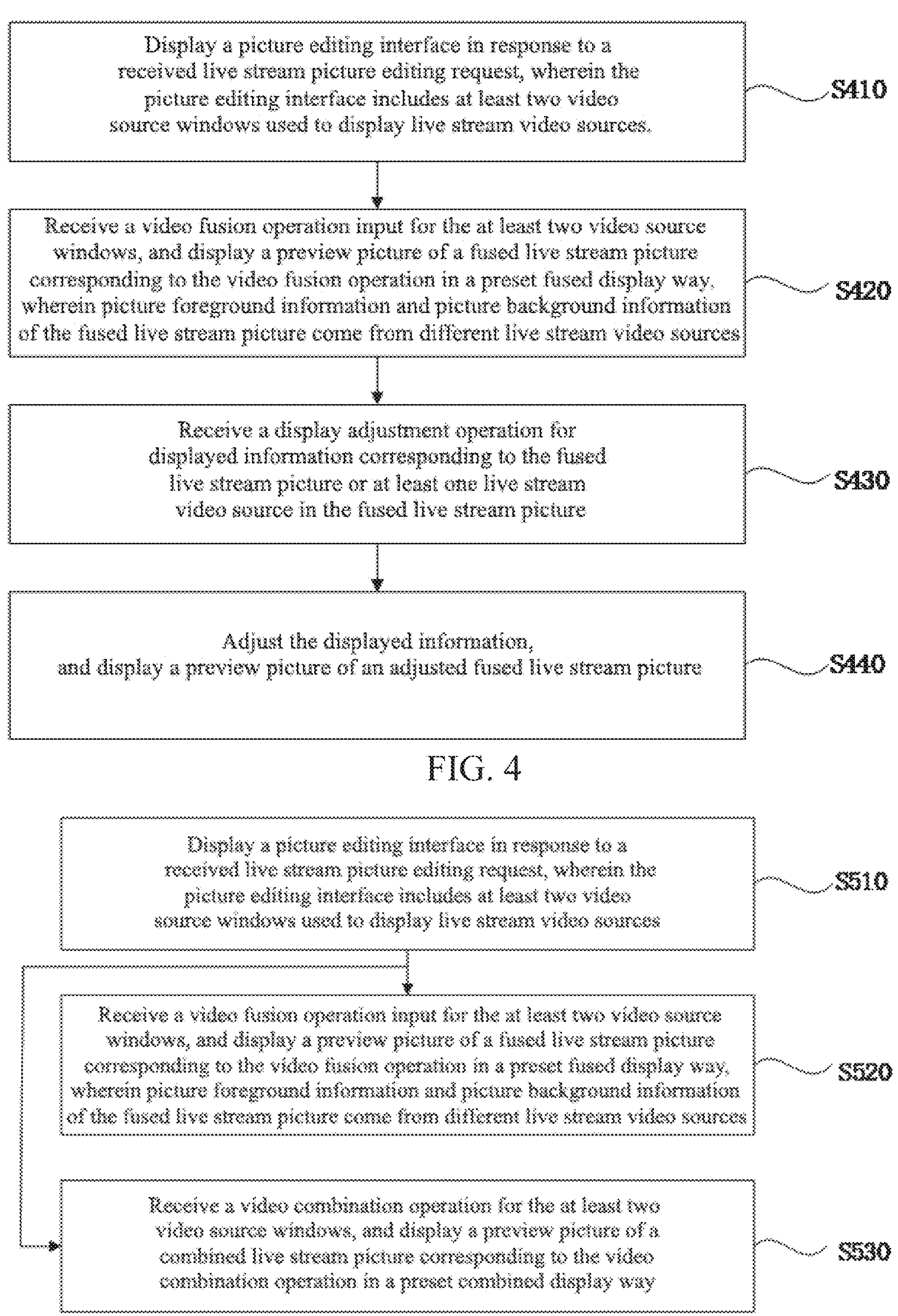
FIG. 4 is a flowchart of a method for displaying live stream picture provided by an embodiment of the present disclosure.
FIG. 5 is a flowchart of a method for displaying live stream picture provided by an embodiment of the present disclosure.

FIG. 4 is a flowchart of a method for displaying live stream picture provided by an embodiment of the present disclosure. On the basis of any optional embodiment of the embodiments of the present disclosure in this embodiment, in an embodiment, after the displaying a preview picture of a fused live stream picture corresponding to the video fusion operation in a preset fused display way, the method further includes: receiving a display adjustment operation for displayed information corresponding to the fused live stream picture or at least one live stream video source in the fused live stream picture, adjusting the displayed information, and displaying a preview picture of an adjusted fused live stream picture.

The technical terms that are the same as or corresponding to the above-mentioned embodiments will not be repeated here.

As shown in FIG. 4, the method of this embodiment may include:

S410: displaying a picture editing interface in response to a received live stream picture editing request, where the picture editing interface includes at least two video source windows used to display live stream video sources.

S420: receiving a video fusion operation input for the at least two video source windows, and displaying a preview picture of a fused live stream picture corresponding to the video fusion operation in a preset fused display way, where picture foreground information and picture background information of the fused live stream picture come from different live stream video sources.

S430: receiving a display adjustment operation for displayed information corresponding to the fused live stream picture or at least one live stream video source in the fused live stream picture.

In this embodiment, after the displaying a preview picture of a fused live stream picture corresponding to the video fusion operation in a preset fused display way, the displayed information of the fused live stream picture can be adjusted, and the displayed information corresponding to the at least one live stream video source in the fused live stream picture can also be adjusted. The display adjustment operation can be understood as an operation used for adjusting all or part of the displayed information in the fused live stream picture. It should be noted that the displayed information can be understood as user-oriented information, which is generally information perceived at a visual or auditory level. Exemplarily, the displayed information may include but is not limited to at least one of information such as a display position, a display size, a display color, a display style, and displayed content. The displayed content may include video source image information and video source sound information in the live stream video source.

It can be understood that at least one live stream video source may be one, two, or more live stream video sources.

In an example, the receiving a display adjustment operation for displayed information corresponding to at least one live stream video source in the fused live stream picture includes: receiving a picture layout adjustment operation for the displayed information corresponding to the at least one live stream video source in the fused live stream picture; and/or receiving a picture beautification adjustment operation input for the at least one live stream video source in the fused live stream picture.

The picture layout adjustment operation can be understood as an adjustment operation for related layout information of each live stream video source in that live stream picture in the fused live stream picture. Exemplarily, the picture layout adjustment operation may include but is not limited to at least one of an adjustment operation for the display position and/or display size of each live stream video source in the fused live stream picture, an operation of increasing or decreasing the live stream video sources, an operation of increasing or decreasing preset picture props and the like. It can be understood that there are various ways to generate the picture layout adjustment operation. Exemplarily, the picture layout adjustment operation may be an operation of adjusting the display position and/or display size of the live stream video source in the fused live stream picture in a dragging manner, or may be an operation of increasing or reducing the live stream video sources by selecting a corresponding control after a right click of an input device is triggered.

Exemplarily, the displayed information corresponding to the at least one live stream video source in the fused live stream picture can also be adjusted by triggering a preset picture layout adjustment control in the picture editing interface. The setting position and display form of the picture layout adjustment control can be determined according to actual needs, which will not be limited here. The picture layout adjustment control may be a virtual control provided on a display interface. A default display form of the picture layout adjustment control may be either a display status or a hidden status. In other words, the transparency of the picture layout adjustment control can be determined according to whether it is triggered or not. For example, when a target trigger operation is detected in a preset trigger region corresponding to the picture layout adjustment control, the picture layout adjustment control is displayed. Furthermore, the trigger operation of the picture layout adjustment control can be received. The target trigger operation may be a cursor clicking on the preset trigger region, or a hovering operation of the cursor in the preset trigger region.

The picture beautification adjustment operation can be understood as an operation used for adjusting related color information in the fused live stream picture. It should be noted that the picture beautification adjustment operation may be an operation acting on a preset beautification adjustment control. The preset beautification adjustment control can be adjusted for different display angles of the picture. For example, the picture beautification adjustment operation may be one of an operation of displaying a lake surface style of the live stream video source as a preset style, an operation of performing beauty processing and/or makeup processing on a target object in the display picture of the live stream video source, an operation of adding a preset filter to the display picture of the live stream video source, and an operation of increasing or reducing preset picture props. Similarly, the picture beautification adjustment operation is also input by the preset picture beautification adjustment control. It should be noted that the number of the picture beautification adjustment controls may be one or more. In other words, a single picture beautification adjustment control can support only one picture beautification adjustment way, or various picture color adjustment ways. When the single picture beautification adjustment control supports the various picture color adjustment ways, different picture beautification adjustment ways can be switched in a manner of clicking or pressing the picture beautification adjustment control.

In an example, the receiving a display adjustment operation for displayed information corresponding to the fused live stream picture includes: receiving a picture beautification adjustment operation for the fused live stream picture. Its adjustment way can be the same as the picture beautification adjustment way for the live stream video source, which will not be repeated here.

S440: adjusting the displayed information, and displaying a preview picture of an adjusted fused live stream picture.

It can be understood that the adjusting the displayed information includes adjusting the displayed information of all the live stream video sources in the fused live stream picture, or adjusting the displayed information of some of the live stream video sources in the fused live stream picture. The adjustment way is related to the display adjustment operation. For example, when the display adjustment operation for the displayed information of the fused live stream picture is received, the displayed information of all the live stream video sources in the fused live stream picture is adjusted. When the display adjustment operation for the displayed information corresponding to the at least one live stream video source in the fused live stream picture is received, the displayed information of the live stream video source in which the display adjustment operation is applied in the fused live stream picture is adjusted.

In this embodiment, after the fused live stream picture is obtained, it supports adjusting some or all of displayed information in the fused live stream picture, the fused live stream picture is adjusted in response to the adjustment operation of a user, and the preview picture of the adjusted fused live stream picture is displayed. Through interaction with the user, the personalized needs of the user is fully met, thereby guaranteeing a final display effect of the live stream picture.

FIG. 5 is a flowchart of a method for displaying live stream picture provided by an embodiment of the present disclosure. On the basis of any optional embodiment of the embodiments of the present disclosure in this embodiment, for a case of multiple live stream video sources, another way of displaying live stream picture is provided, that is, combined display is performed on two or more live stream video sources. In an example, the method further includes: receiving a video combination operation for the at least two video source windows, and displaying a preview picture of a combined live stream picture corresponding to the video combination operation in a preset combined display way.

The technical terms that are the same as or corresponding to the above-mentioned embodiments will not be repeated here.

As shown in FIG. 5, the method of this embodiment may include:

S510: displaying a picture editing interface in response to a received live stream picture editing request, where the picture editing interface includes at least two video source windows used to display live stream video sources.

S520: receiving a video fusion operation input for the at least two video source windows, and displaying a preview picture of a fused live stream picture corresponding to the video fusion operation in a preset fused display way, where picture foreground information and picture background information of the fused live stream picture come from different live stream video sources.

S530: receiving a video combination operation for the at least two video source windows, and displaying a preview picture of a combined live stream picture corresponding to the video combination operation in a preset combined display way.

Similarly, the method for displaying live stream picture in this embodiment of the present disclosure may further include: receiving a combined layout trigger operation acting on a preset combined layout control; and furthermore, displaying the preview picture of the combined live stream picture according to a preset combined layout template corresponding to the combined layout trigger operation.

The preset combined layout template includes a maximum number of live stream video sources allowed to be combined, and a display size and a display position of each live stream video source. The preset combined layout template can be understood as a preset template or sample for the display size and display position of each live stream video source for video source combination in the combined live stream picture. It can be understood that the number of the preset combined layout templates may be one or more. A style of the preset combined layout template can be set according to actual needs, which will not be limited here. Exemplarily, different preset combined layout controls can be provided according to a maximum number of combined live stream video sources. For example, different preset combined layout templates can also be provided according to the display size and display position of each video source for the number of certain live stream video sources to be combined.

It should be noted that a correspondence relationship between the preset combined layout template and the preset combined layout control may be a one-to-one correspondence relationship or a many-to-one correspondence relationship. When a preset combined layout control corresponds to multiple preset combined layout templates, a preset combined layout template corresponding to the preset combined layout control can be switched by the combined layout trigger operation acting on the preset combined layout control.

This embodiment not only supports the fusion of two or more live stream video sources, but also supports the combination of two or more live stream video sources, which further enriches the display way of the live stream picture, and can provide different video source processing ways especially when multiple video sources need to be displayed, and thereby, the personalized needs of the user are better met, and user experience is further promoted.

On the basis of any optional embodiment of the present disclosure, the method for displaying live stream picture may further include: pushing a target live stream picture to a target live stream room, where the target live stream picture includes a live stream video source, a fused live stream picture or a combined live stream picture.

In order to enable viewing users to see an edited live stream picture, after being obtained, the target live stream picture can be pushed to a target live stream room. For example, a push trigger operation acting on a preset push control can be received and a push address entry box is displayed; and a target push address entered based on the push address entry box is acquired, and the target live stream picture is pushed a target live stream room corresponding to the target push address. It can be understood that different live stream users have different requests on the live stream picture. Therefore, the target live stream picture can be determined according to the actual situation, which may be at least one of the live stream video sources, or a fused live stream picture obtained after two or more live stream video sources are fused, or a combined live stream picture obtained after two or more live stream video sources are combined.

The advantage of this setting is that a picture between the live stream user and the viewing users can be synchronized, the target live stream picture is displayed to the viewing users in the target live stream room, thereby better implementing real-time interaction between the live stream user and the viewing users while enriching the live stream picture.

Figure 6:
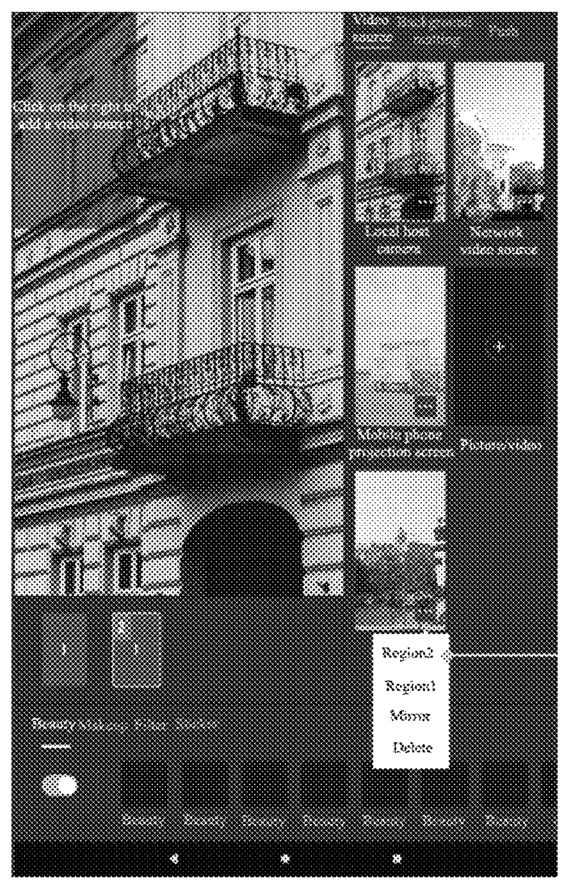
FIG. 6 is a schematic diagram of a picture editing interface in a method for displaying live stream picture provided by an embodiment of the present disclosure.

FIG. 6 is a schematic diagram of a picture editing interface in a method for displaying live stream picture provided by an embodiment of the present disclosure. Introductions are made with a scenario where a combined live stream picture is obtained taken as an example. As shown in FIG. 6, the picture editing interface may include a picture preview region (such as a large rectangular box in the upper left corner of FIG. 6) used for displaying a preview picture of the live stream picture, video source windows (such as five small rectangular boxes on the right side) used to display live stream video sources, and a picture editing control used to edit the live stream picture. The picture editing control may include a foreground video source display control (such as a "video source" control in FIG. 6), a background video source display control (such as a "matting background" control in FIG. 6), a preset push control (such as a "push" control in FIG. 6), a preset combined layout control (such as two small rectangular boxes with numbers "1" and "12" displayed in a line below a large rectangular box on the left side), and a preset beautification adjustment control (such as "beauty", "makeup", "filter", and "sticker" in FIG. 6).

In this embodiment, a foreground video source is displayed in the video source window corresponding to a video source control, and each video source window identifies the source of the live stream video source displayed in the video source window. When one of the live stream video sources is selected, the selected live stream video source can be displayed in the picture preview region on the left side. If the preset combined layout control selects "12", that is, two pictures are combined, the selected live stream video source is displayed in the picture preview region by a preset combined layout template. When it is necessary to add a live stream video source to the preset combined layout template, a corresponding sub-display region of the preset combined layout template can be clicked to add the live stream video source, or an add indication control region 1 or region 2 in the lower right corner of the video source window can also be clicked to add the live stream video source into the corresponding sub-display region of the preset combined layout template. The live stream video source can also be added or deleted in a dragging manner. When it is necessary to add the live stream video source into the preset combined layout template, displayed information of the live stream video source in the video source window can be deleted by clicking "Delete" in the lower right corner of the video source window, and no longer displayed.

Each preset beautification adjustment control may correspond to one or more preset beautification adjustment templates for users to select. The preset beautification adjustment template can only be used to adjust the live stream video sources in some sub-display regions in the preset combined layout template, such as only adjust the live stream video source corresponding to a local host camera. All the live stream video sources in the preset combined layout template can also be adjusted.

By clicking on background matting, switched display of a background video source window will be performed in a current region of displaying a foreground video source window, where the background video source window is used to display a background video source. On the premise of selecting the foreground video source, a fused live stream picture can be obtained by selecting the background video source. It can be understood that the background video source can be selected firstly and then the foreground video source can be selected to obtain the fused live stream picture.

By clicking on push, a push address entry box used for inputting a push address will be displayed, a target push address of a target live stream room is entered into the push address entry box, and "Start Push" is clicked, and thus, a live stream picture of the picture preview region is pushed to the live stream room. It should be noted that there may be multiple push address entry boxes, that is, in a case where multiple push addresses are entered, a same live stream picture can be pushed to different live stream rooms. In an example, an "End Push" control is further provided, and the control can be clicked to end the display of the live stream picture in the picture preview region in the live stream room.

By employing the method for displaying live stream picture provided in this embodiment of the present disclosure, while the personalized display needs of the user for the live stream picture are met, interaction costs of the users are reduced as much as possible, the display effect is enriched, and user experience is promoted.

Figure 7:
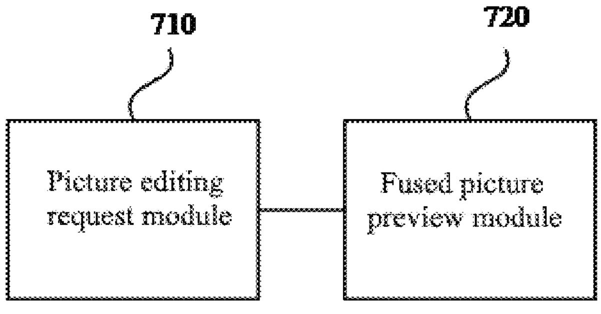
FIG. 7 is a structural schematic diagram of an apparatus for displaying live stream picture provided by an embodiment of the present disclosure.

FIG. 7 is a flowchart of an apparatus for displaying live stream picture provided by an embodiment of the present disclosure. The apparatus for displaying live stream picture provided in this embodiment can be implemented by software and/or hardware, and can be configured in a terminal and/or a server to implement the method for displaying live stream picture in this embodiment of the present disclosure.

The apparatus may include: a picture editing request module 710 and a fused picture preview module 720.

The picture editing request module 710 is configured to display a picture editing interface in response to a received live stream picture editing request, where the picture editing interface includes at least two video source windows used to display live stream video sources; and the fused picture preview module 720 is configured to receive a video fusion operation input for the at least two video source windows, and display a preview picture of a fused live stream picture corresponding to the video fusion operation in a preset fused display way, where picture foreground information and picture background information of the fused live stream picture come from different live stream video sources.

In this embodiment, a picture editing interface including at least two video source windows used to display live stream video sources is displayed by the picture editing request module in response to a received live stream picture editing request, thereby providing an interaction function with a user, and a picture editing entry is provided for the user in response to the live stream picture editing request of the user; then, a video fusion operation input for the at least two video source windows is received by the fused picture preview module, and a preview picture of a fused live stream picture corresponding to the video fusion operation is displayed in a preset fused display way, where picture foreground information and picture background information of the fused live stream picture come from different live stream video sources, which can fuse the live stream video sources corresponding to two or more video source windows, implement linkage between the two or more live stream video sources, enrich the display effect of videos, increase the fun of live stream, avoid a case where the display form of the live stream picture is single and editing is not supported, and enable the user to visually observe the presentation effect of the fused live stream picture, and thereby, the personalized needs of the user can be better met, and the live stream experience of the user is promoted.

On the basis of any optional embodiment of the embodiments of the present disclosure, in an embodiment, the video fusion operation includes a picture foreground selection operation and a picture background selection operation, and the video source windows include a foreground video source window and a background video source window. The fused picture preview module includes a foreground selection unit, a background selection unit, and a picture preview unit.

The foreground selection unit is configured to receive a picture foreground selection operation for at least one foreground video source window, where a live stream video source displayed in a selected foreground video source window is taken as a foreground video source; the background selection unit is configured to receive a picture background selection operation for at least one background video source window, where a live stream video source displayed in a selected background video source window is taken as a background video source; and the picture preview unit is configured to display a preview picture of fused live stream picture corresponding to the foreground video source and the background video source in a preset fused display way.

On the basis of any optional embodiment of the embodiments of the present disclosure, in an embodiment, the foreground video source window and the background video source window switch display based on a switching trigger operation acting on a preset video source window switching control.

On the basis of any optional embodiment of the embodiments of the present disclosure, in an embodiment, the apparatus further includes:

A video source acquisition module, configured to acquire a foreground video source and a background video source corresponding to the video fusion operation before the displaying a fused live stream picture corresponding to the video fusion operation, and respectively determining a foreground image to be processed of the foreground video source and a background image to be processed of the background video source, where the foreground image to be processed and the background image to be processed have same time information; and An image fusion module, configured to determine image foreground information of the foreground image to be processed and image background information of the background image to be processed, where the image foreground information is taken as the picture foreground information of the fused live stream picture, and the image background information is taken as the picture background information of the fused live stream picture, and fuse the picture foreground information with the picture background information to obtain the fused live stream picture corresponding to the video fusion operation.

On the basis of any optional embodiment of the embodiments of the present disclosure, in an embodiment, the apparatus further includes: a fused layout trigger module, where the fused layout trigger module is configured to receive a fused layout trigger operation acting on a preset fused layout control. Correspondingly, the fused picture preview module is further configured to display the preview picture of the fused live stream picture according to a preset fused layout template corresponding to the fused layout trigger operation, where the preset fused layout template includes a maximum number of live stream video sources allowed to be fused, and a display size and a display position of each live stream video source.

On the basis of any optional embodiment of the embodiments of the present disclosure, in an embodiment, the apparatus further includes:

A picture display adjustment module, configured to receive a display adjustment operation for displayed information corresponding to the fused live stream picture or at least one live stream video source in the fused live stream picture after the displaying a preview picture of a fused live stream picture corresponding to the video fusion operation in a preset fused display way, adjust the displayed information, and display a preview picture of an adjusted fused live stream picture.

On the basis of any optional embodiment of the embodiments of the present disclosure, in an embodiment, the picture display adjustment module is configured to:

Receive a picture layout adjustment operation for the displayed information corresponding to the at least one live stream video source in the fused live stream picture; and/or Receive a picture beautification adjustment operation input for the at least one live stream video source in the fused live stream picture.

On the basis of any optional embodiment of the embodiments of the present disclosure, in an embodiment, the apparatus further includes:

A video source acquisition module, configured to acquire live stream video sources, and display the live stream video sources in the video source windows used to display the live stream video sources.

On the basis of any optional embodiment of the embodiments of the present disclosure, in an embodiment, the live stream video source includes at least one of video data of a local host camera, video data of an external camera, screen video data of an external device, network video data, picture or video data in a local host target storage space, or picture or video data in a cloud target storage space.

On the basis of any optional embodiment of the embodiments of the present disclosure, in an embodiment, the apparatus further includes:

A video source picture preview module, configured to receive a video display operation input for the video source window, and display a preview picture of the live stream video source corresponding to the video source window.

On the basis of any optional embodiment of the embodiments of the present disclosure, in an embodiment, the apparatus further includes:

A combined picture preview module, configured to receive a video combination operation for the at least two video source windows, and display a preview picture of a combined live stream picture corresponding to the video combination operation in a preset combined display way.

On the basis of any optional embodiment of the embodiments of the present disclosure, in an embodiment, the apparatus further includes: a combined layout trigger module. The combined layout trigger module is configured to receive a combined layout trigger operation acting on a preset combined layout control. Correspondingly, the combined picture preview module is configured to display the preview picture of the combined live stream picture according to a preset combined layout template corresponding to the combined layout trigger operation.

On the basis of any optional embodiment of the embodiments of the present disclosure, in an embodiment, the apparatus further includes:

A video push module, configured to push a target live stream picture to a target live stream room, where the target live stream picture includes a live stream video source, a fused live stream picture or a combined live stream picture.

The apparatus for displaying live stream picture can execute the method for displaying live stream picture provided in any embodiment of the present disclosure, and has the corresponding functional modules for executing the method for displaying live stream picture and beneficial effects.

It is worth noting that each unit and module included in the above-mentioned apparatus is only divided according to functional logic, but it is not limited to the above division, as long as corresponding functions can be implemented. In addition, specific names of all the functional units are only for the convenience of distinguishing them from each other, and are not used to limit the scope of protection of the embodiments of the present disclosure.

Figure 8:
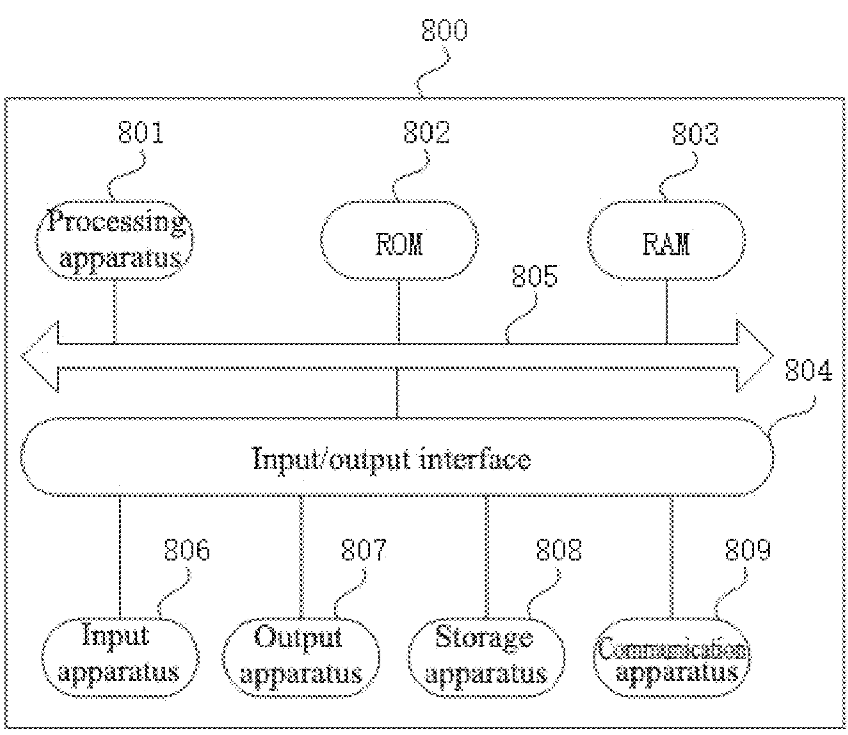
FIG. 8 is a structural schematic diagram of an electronic device provided by an embodiment of the present disclosure.

FIG. 8 is a structural schematic diagram of an electronic device provided by an embodiment of the present disclosure. Referring to FIG. 8 below, FIG. 8 shows a structural schematic diagram of an electronic device (a terminal device or server shown in FIG. 8) 800 suitable for implementing an embodiment of the present disclosure. The terminal devices in an embodiment of the present disclosure may include but are not limited to mobile terminals such as a mobile phone, a laptop, a digital stream receiver, a personal digital assistant (PDA), a portable Android device (PAD), a portable multimedia player (PMP), and a vehicle terminal (e.g., a vehicle navigation terminal), and fixed terminals such as a television (TV) and a desktop computer. The electronic device shown in FIG. 8 is only an example, and should not impose any limitation on the function and scope of use of the embodiments of the present disclosure.

As shown in FIG. 8, the electronic device 800 may include a processing apparatus (e.g., a central processing unit, a graphics processing unit, etc.) 801, which may execute various appropriate actions and processing according to programs stored in a read-only memory (ROM) 802 or programs loaded into a random-access memory (RAM) 803 from a storing apparatus 808. In the RAM 803, various programs and data required for operations of electronic device 800 are also stored. The processing apparatus 801, the ROM 802, and the RAM 803 are connected one another via a bus 805. An input/output (I/O) interface 804 is also connected to the bus 805.

Generally, the following apparatuses can be connected to the I/O interface 804: an input apparatus 806, including, for example, a touch screen, a touch pad, a keyboard, a mouse, a camera, a microphone, an accelerometer, a gyroscope and the like; an output apparatus 807, including, for example, a liquid crystal display (LCD), a loudspeaker, a vibrator and the like; the storing apparatus 808, including, for example, a tape, a hard disk and the like; and a communication apparatus 809. The communication apparatus 809 may allow the electronic device 800 to perform wireless or wired communication with other devices to exchange data. Although FIG. 8 shows the electronic device 800 having various apparatuses, it should be understood that it is not required to implement or provide all the apparatuses shown. More or fewer apparatuses may alternatively be implemented or provided.

Particularly, according to an embodiment of the present disclosure, a process described above with reference to the flowchart can be implemented as a computer software program. For example, an embodiment of the present disclosure includes a computer program product including a computer program carried in a non-transient computer-readable medium, where the computer program includes a program code used for executing a method shown in a flowchart. In such an embodiment, the computer program can be downloaded and installed from a network through the communication apparatus 809, or installed from the storing apparatus 808, or from the ROM 802. When the computer program is executed by the processing apparatus 801, the above-mentioned functions defined in the method of the embodiment of the present disclosure are executed.

The names of messages or information interacted between a plurality of apparatuses in the implementations of the present disclosure are only used for illustrative purposes, and are not used to limit the scope of these messages or information.

The electronic device provided by an embodiment of the present disclosure belongs to the same inventive concept as the method for displaying live stream picture provided by the above-mentioned embodiments. The technical details not described in detail in this embodiment can be found in the above-mentioned embodiment, and this embodiment has the same beneficial effects as the above-mentioned embodiments.

Embodiment VIII

An embodiment of the present disclosure provides a computer-readable storage medium having a computer program stored thereon, where the program, when executed by a processor, implements the method for displaying live stream picture provided by the above-mentioned embodiments.

It should be noted that the above-mentioned computer-readable medium of the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. Examples of the computer-readable storage medium may include but are not limited to electrical connections with one or more conducting wires, a portable computer disc, a hard disk, a random-access memory (RAM), a read-only memory (ROM), an erasable programmable read-only memory (EPROM), or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program, which may be used by or in combination with an instruction executing system, apparatus or device. In the present disclosure, the computer-readable signal medium may include a data signal propagated in a baseband or as part of a carrier, in which a computer-readable program code is carried. Such propagated data signal may take various forms, including but not limited to an electromagnetic signal, an optical signal or any suitable combination thereof. The computer-readable signal medium may also be any computer-readable medium other than the computer-readable storage medium, which may send, propagate, or transmit the program used by or in combination with the instruction executing system, apparatus or device. The program code included in the computer-readable medium can be transmitted with any appropriate medium, including but not limited to: a wire, an optical cable, radio frequency (RF), etc., or any suitable combination thereof.

In some implementations, a client and a server can perform communication by using any currently known or future developed network protocol, such as HTTP (HyperText Transfer Protocol), and can be interconnected with digital data communication (for example, a communication network) of any form or medium. Examples of the communication network include a local area network (LAN), a wide area network (WAN), Internet work (e.g., Internet), and a peer-to-peer network (e.g., ad hoc peer-to-peer network), as well as any network currently known or developed in the future.

The computer-readable medium may be included in the electronic device, or can stand alone without being assembled into the electronic device.

The above-mentioned computer-readable medium carries one or more programs, which, when executed by the electronic device, cause the electronic device to:

Display a picture editing interface in response to a received live stream picture editing request, where the picture editing interface includes at least two video source windows used to display live stream video sources; and Receive a video fusion operation input for the at least two video source windows, and display a preview picture of a fused live stream picture corresponding to the video fusion operation in a preset fused display way, where picture foreground information and picture background information of the fused live stream picture come from different live stream video sources.

The storage medium may be a non-transient storage medium.

A computer program code for executing the operations of the present disclosure may be written in one or more programming languages or a combination thereof, the programming languages including but not limited to object-oriented programming languages such as Java, Smalltalk, C++, and further including conventional procedural programming languages such as "C" language or similar programming languages. The program code can be executed completely on a user computer, partially on the user computer, as an independent software package, partially on the user computer and partially on a remote computer, or completely on the remote computer or server. In a case involving the remote computer, the remote computer may be connected to the user computer through any type of networks, including the local area network (LAN) or wide area network (WAN), or may be connected to an external computer (for example, connected via the Internet by using an Internet service provider).

The flowcharts and block diagrams in the accompanying drawings illustrate possible architectures, functions and operations of the systems, methods and computer program products according to various embodiments of the present disclosure. In this regard, each block in the flowchart or block diagram may represent a module, program segment, or part of a code. The module, program segment, or part of a code includes one or more executable instructions used for implementing a specified logic function. It should also be noted that in some alternative implementations, functions marked in the block may also occur in a different order from those marked in the drawings. For example, two consecutively represented blocks can actually be executed basically in parallel, or can sometimes be executed in a reverse order, depending on the function involved. It should also be noted that each block in the block diagram and/or flow diagram, and a combination of the blocks in the block diagram and/or flow diagram, can be implemented with a dedicated hardware-based system that executes the specified function or operation, or can be implemented with a combination of dedicated hardware and a computer instruction.

The involved unit described in the embodiments of the present disclosure can be implemented in software or hardware. The name of the unit does not constitute the limitation of the unit itself in some cases, for example, a first acquisition unit can also be described as "a unit of acquiring at least two Internet protocol addresses".

The functions described above herein may be executed at least partially via one or more hardware logic units. For example, without limitation, exemplary types of hardware logic units that can be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium may be a tangible medium, which may include or store a program used by or in combination with an instruction executing system, apparatus or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. Examples of the machine-readable storage medium will include an electric connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination thereof.

According to one or more embodiments of the present disclosure provides a method for displaying live stream picture, including:

displaying a picture editing interface in response to a received live stream picture editing request, wherein the picture editing interface includes at least two video source windows used to display live stream video sources; and receiving a video fusion operation input for the at least two video source windows, and displaying a preview picture of a fused live stream picture corresponding to the video fusion operation in a preset fused display way, wherein picture foreground information and picture background information of the fused live stream picture come from different live stream video sources.

According to one or more embodiments of the present disclosure provides a method for displaying live stream picture, wherein the video fusion operation includes a picture foreground selection operation and a picture background selection operation, and the at least two video source windows include a foreground video source window and a background video source window;

the receiving a video fusion operation input for the at least two video source windows, and displaying a preview picture of a fused live stream picture corresponding to the video fusion operation in a preset fused display way includes:

receiving a picture foreground selection operation for at least one foreground video source window, and taking the live stream video source displayed in a selected foreground video source window as a foreground video source;

receiving a picture background selection operation for at least one background video source window, and taking the live stream video source displayed in a selected background video source window as a background video source; and displaying a preview picture of a fused live stream picture corresponding to the foreground video source and the background video source in the preset fused display way.

According to one or more embodiments of the present disclosure provides a method for displaying live stream picture, wherein the foreground video source window and the background video source window switch display based on a switching trigger operation acting on a preset video source window switching control.

According to one or more embodiments of the present disclosure provides a method for displaying live stream picture, wherein the method further includes:

acquiring a foreground video source and a background video source corresponding to the video fusion operation, and respectively determining a foreground image to be processed of the foreground video source and a background image to be processed of the background video source, wherein the foreground image to be processed and the background image to be processed have same time information; and determining image foreground information of the foreground image to be processed and image background information of the background image to be processed, taking the image foreground information as the picture foreground information of the fused live stream picture, taking the image background information as the picture background information of the fused live stream picture, and fusing the picture foreground information with the picture background information to obtain the fused live stream picture corresponding to the video fusion operation.

According to one or more embodiments of the present disclosure provides a method for displaying live stream picture, wherein the method further includes:

receiving a fused layout trigger operation acting on a preset fused layout control;

the displaying a preview picture of a fused live stream picture corresponding to the video fusion operation in a preset fused display way includes:

displaying the preview picture of the fused live stream picture according to a preset fused layout template corresponding to the fused layout trigger operation, wherein the preset fused layout template includes a maximum number of live stream video sources allowed to be fused, and a display size and a display position of the live stream video source.

According to one or more embodiments of the present disclosure provides a method for displaying live stream picture, wherein the method further includes:

receiving a display adjustment operation for displayed information corresponding to the fused live stream picture or at least one live stream video source in the fused live stream picture, adjusting the displayed information, and displaying a preview picture of an adjusted fused live stream picture.

According to one or more embodiments of the present disclosure provides a method for displaying live stream picture, wherein the method further includes:

receiving a picture layout adjustment operation for the displayed information corresponding to the at least one live stream video source in the fused live stream picture; or receiving a picture beautification adjustment operation input for the at least one live stream video source in the fused live stream picture.

According to one or more embodiments of the present disclosure provides a method for displaying live stream picture, wherein the method further includes:

acquiring the live stream video sources, and displaying the live stream video sources in the video source windows used to display the live stream video sources.

According to one or more embodiments of the present disclosure provides a method for displaying live stream picture, wherein a live stream video source includes at least one of video data of a local host camera, video data of an external camera, screen video data of an external device, network video data, picture or video data in a local host target storage space, or picture or video data in a cloud target storage space.

According to one or more embodiments of the present disclosure provides a method for displaying live stream picture, wherein the method further includes:

receiving a video display operation input for a video source window, and displaying a preview picture of a live stream video source corresponding to the video source window.

According to one or more embodiments of the present disclosure provides a method for displaying live stream picture, wherein the method further includes:

receiving a video combination operation input for the at least two video source windows, and displaying a preview picture of a combined live stream picture corresponding to the video combination operation in a preset combined display way.

According to one or more embodiments of the present disclosure provides a method for displaying live stream picture, wherein the method further includes:

receiving a combined layout trigger operation acting on a preset combined layout control;

the displaying a preview picture of a combined live stream picture corresponding to the video combination operation in a preset combined display way includes:

displaying the preview picture of the combined live stream picture according to a preset combined layout template corresponding to the combined layout trigger operation.

According to one or more embodiments of the present disclosure provides a method for displaying live stream picture, wherein the method further includes:

pushing a target live stream picture to a target live stream room, wherein the target live stream picture includes a live stream video source, a fused live stream picture or a combined live stream picture.

According to one or more embodiments of the present disclosure provides an apparatus for displaying live stream picture including a picture editing request module and a fused picture preview module, the picture editing request module is configured to display a picture editing interface in response to a received live stream picture editing request, wherein the picture editing interface includes at least two video source windows used to display live stream video sources; and the fused picture preview module is configured to receive a video fusion operation input for the at least two video source windows, and display a preview picture of a fused live stream picture corresponding to the video fusion operation in a preset fused display way, wherein picture foreground information and picture background information of the fused live stream picture come from different live stream video sources.

Those skilled in the art should understand that the disclosure scope involved in the present disclosure is not limited to the embodiments formed by the specific combination of the above technical features, but also should encompass other embodiments formed by the arbitrary combination of the above technical features or their equivalent features without departing from the above disclosure concept, for example, embodiments formed by replacing the above features with (but not limited to) technical features with similar functions disclosed in the present disclosure.

Furthermore, although all the operations are described in a particular order, it should not be understood as requiring the operations to be executed in the particular order shown or in a sequential order. Under certain circumstances, multitasking and parallel processing may be advantageous. Similarly, although the above discussion includes several specific implementation details, these should not be construed as limiting the scope of the present disclosure. Certain features described in the context of separate embodiments may also be implemented in combination in a single embodiment. Conversely, various features described in the context of the single embodiment may also be implemented in multiple embodiments individually or in any suitable sub combination.

Although the subject has been described in language specific to the structural features and/or method logic actions, it should be understood that the subject defined in the appended claims is not necessarily limited to the specific features or actions described above. Conversely, the specific features and actions described above are only example forms of implementing the claims.

What is claimed is:

1. A method for displaying live stream picture, comprising:

displaying a picture editing interface in response to a received live stream picture editing request, wherein the picture editing interface comprises a plurality of video source windows used to display live stream video sources; and receiving a video fusion operation that is input for at least two video source windows, and displaying a preview picture of a fused live stream picture corresponding to the video fusion operation in a preset fused display way, wherein the video fusion operation comprises selecting the at least two video source windows from the plurality of video source windows, and fusing at least two live stream video sources displayed in the at least two video source windows to obtain the preview picture, and picture foreground information and picture background information of the fused live stream picture come from different live stream video sources.

2. The method according to claim 1, wherein the video fusion operation comprises a picture foreground selection operation and a picture background selection operation, and the at least two video source windows comprise a foreground video source window and a background video source window;

the receiving a video fusion operation that is input for at least two video source windows, and displaying a preview picture of a fused live stream picture corresponding to the video fusion operation in a preset fused display way comprises:

receiving a picture foreground selection operation for at least one foreground video source window, and taking the live stream video source displayed in a selected foreground video source window as a foreground video source;

receiving a picture background selection operation for at least one background video source window, and taking the live stream video source displayed in a selected background video source window as a background video source; and displaying a preview picture of a fused live stream picture corresponding to the foreground video source and the background video source in the preset fused display way.

3. The method according to claim 2, wherein the foreground video source window and the background video source window switch display based on a switching trigger operation acting on a preset video source window switching control.

4. The method according to claim 1, wherein before displaying a fused live stream picture corresponding to the video fusion operation, the method further comprises:

acquiring a foreground video source and a background video source corresponding to the video fusion operation, and respectively determining a foreground image to be processed of the foreground video source and a background image to be processed of the background video source, wherein the foreground image to be processed and the background image to be processed have same time information; and determining image foreground information of the foreground image to be processed and image background information of the background image to be processed, taking the image foreground information as the picture foreground information of the fused live stream picture, taking the image background information as the picture background information of the fused live stream picture, and fusing the picture foreground information with the picture background information to obtain the fused live stream picture corresponding to the video fusion operation.

5. The method according to claim 1, further comprising: receiving a fused layout trigger operation acting on a preset fused layout control;

the displaying a preview picture of a fused live stream picture corresponding to the video fusion operation in a preset fused display way comprises:

displaying the preview picture of the fused live stream picture according to a preset fused layout template corresponding to the fused layout trigger operation, wherein the preset fused layout template comprises a maximum number of live stream video sources allowed to be fused, and a display size and a display position of the live stream video source.

6. The method according to claim 1, wherein after the displaying a preview picture of a fused live stream picture corresponding to the video fusion operation in a preset fused display way, the method further comprises:

receiving a display adjustment operation for displayed information corresponding to the fused live stream picture or at least one live stream video source in the fused live stream picture, adjusting the displayed information, and displaying a preview picture of an adjusted fused live stream picture.

7. The method according to claim 6, wherein receiving a display adjustment operation for displayed information corresponding to at least one live stream video source in the fused live stream picture comprises at least one of the steps of:

receiving a picture layout adjustment operation for the displayed information corresponding to the at least one live stream video source in the fused live stream picture; or receiving a picture beautification adjustment operation that is input for the at least one live stream video source in the fused live stream picture, wherein the picture beautification adjustment operation is used to adjust relevant color information in the fused live stream picture.

8. The method according to claim 1, further comprising: acquiring the live stream video sources, and displaying the live stream video sources in the plurality of video source windows used to display the live stream video sources.

9. The method according to claim 8, wherein a live stream video source comprises at least one of video data of a local host camera, video data of an external camera, screen video data of an external device, network video data, picture or video data in a local host target storage space, or picture or video data in a cloud target storage space.

10. The method according to claim 1, further comprising: receiving a video display operation input for a video source window, and displaying a preview picture of a live stream video source corresponding to the video source window.

11. The method according to claim 1, further comprising: receiving a video combination operation that is input for the at least two video source windows, and displaying a preview picture of a combined live stream picture corresponding to the video combination operation in a preset combined display way.

12. The method according to claim 11, further comprising:

receiving a combined layout trigger operation acting on a preset combined layout control;

the displaying a preview picture of a combined live stream picture corresponding to the video combination operation in a preset combined display way comprises:

displaying the preview picture of the combined live stream picture according to a preset combined layout template corresponding to the combined layout trigger operation.

13. The method according to claim 1, further comprising: pushing a target live stream picture to a target live stream room, wherein the target live stream picture comprises a live stream video source, a fused live stream picture or a combined live stream picture.

14. An electronic device, comprising:

one or more processors;

a storing apparatus, configured to store one or more programs, wherein the one or more programs, when executed by the one or more processors, cause the one or more processors implement a method for displaying live stream picture, the method comprises:

displaying a picture editing interface in response to a received live stream picture editing request, wherein the picture editing interface comprises a plurality of video source windows used to display live stream video sources; and receiving a video fusion operation that is input for at least two video source windows, and displaying a preview picture of a fused live stream picture corresponding to the video fusion operation in a preset fused display way, wherein the video fusion operation comprises selecting the at least two video source windows from the plurality of video source windows, and fusing at least two live stream video sources displayed in the at least two video source windows to obtain the preview picture, and picture foreground information and picture background information of the fused live stream picture come from different live stream video sources.

15. The electronic device according to claim 14, wherein the video fusion operation comprises a picture foreground selection operation and a picture background selection operation, and the at least two video source windows comprise a foreground video source window and a background video source window;

the receiving a video fusion operation that is input for at least two video source windows, and displaying a preview picture of a fused live stream picture corresponding to the video fusion operation in a preset fused display way comprises:

receiving a picture foreground selection operation for at least one foreground video source window, and taking the live stream video source displayed in a selected foreground video source window as a foreground video source;

receiving a picture background selection operation for at least one background video source window, and taking the live stream video source displayed in a selected background video source window as a background video source; and displaying a preview picture of a fused live stream picture corresponding to the foreground video source and the background video source in the preset fused display way.

16. The electronic device according to claim 15, wherein the foreground video source window and the background video source window switch display based on a switching trigger operation acting on a preset video source window switching control.

17. The electronic device according to claim 14, wherein the method further comprising:

receiving a fused layout trigger operation acting on a preset fused layout control;

the displaying a preview picture of a fused live stream picture corresponding to the video fusion operation in a preset fused display way comprises:

displaying the preview picture of the fused live stream picture according to a preset fused layout template corresponding to the fused layout trigger operation, wherein the preset fused layout template comprises a maximum number of live stream video sources allowed to be fused, and a display size and a display position of the live stream video source.

18. A non-transitory computer-readable storage medium having a computer program stored thereon, wherein the computer program, when executed by a processor, implements a method for displaying live stream picture, the method comprises:

displaying a picture editing interface in response to a received live stream picture editing request, wherein the picture editing interface comprises a plurality of video source windows used to display live stream video sources; and receiving a video fusion operation that is input for at least two video source windows, and displaying a preview picture of a fused live stream picture corresponding to the video fusion operation in a preset fused display way, wherein the video fusion operation comprises selecting the at least two video source windows from the plurality of video source windows, and fusing at least two live stream video sources displayed in the at least two video source windows to obtain the preview picture, and picture foreground information and picture background information of the fused live stream picture come from different live stream video sources.

19. The non-transitory computer-readable storage medium according to claim 16, wherein the video fusion operation comprises a picture foreground selection operation and a picture background selection operation, and the at least two video source windows comprise a foreground video source window and a background video source window;

the receiving a video fusion operation that is input for at least two video source windows, and displaying a preview picture of a fused live stream picture corresponding to the video fusion operation in a preset fused display way comprises:

receiving a picture foreground selection operation for at least one foreground video source window, and taking the live stream video source displayed in a selected foreground video source window as a foreground video source;

receiving a picture background selection operation for at least one background video source window, and taking the live stream video source displayed in a selected background video source window as a background video source; and displaying a preview picture of a fused live stream picture corresponding to the foreground video source and the background video source in the preset fused display way.

20. The non-transitory computer-readable storage medium according to claim 19, wherein the foreground video source window and the background video source window switch display based on a switching trigger operation acting on a preset video source window switching control.

* * * * *